United States Patent [19]

Berry

[11] Patent Number: 4,663,734
[45] Date of Patent: May 5, 1987

[54] PRINT PULSE CONTROLLER FOR A TERMAL PRINTHEAD

[75] Inventor: Jeffrey R. Berry, Wakefield, R.I.

[73] Assignee: Gulton Industries, Inc., East Greenwich, R.I.

[21] Appl. No.: 595,983

[22] Filed: Apr. 2, 1984

[51] Int. Cl.⁴ .............................................. G06F 3/12
[52] U.S. Cl. .................................. 364/900; 400/120; 364/518; 346/76 PH; 219/216
[58] Field of Search ... 364/200 MS File, 900 MS File, 364/518; 346/76 PH, 1.1; 219/216, 216 PH; 400/120

[56] References Cited

U.S. PATENT DOCUMENTS

| 4,510,505 | 4/1985 | Fukui | 346/76 PH |
| 4,514,738 | 4/1985 | Nagato et al. | 346/76 PH |
| 4,524,368 | 6/1985 | Inui et al. | 346/76 PH |
| 4,536,774 | 8/1985 | Inui et al. | 346/76 PH |
| 4,539,571 | 9/1985 | Suzuki | 346/76 PH |
| 4,543,588 | 9/1985 | Fukui | 346/76 PH |
| 4,556,891 | 12/1985 | Matsushita et al. | 346/76 PH |
| 4,560,993 | 12/1985 | Hakoyama | 346/76 PH |
| 4,573,058 | 2/1986 | Brooks | 346/76 PH |

Primary Examiner—Archie E. Williams
Attorney, Agent, or Firm—Darby & Darby

[57] ABSTRACT

A thermal print pulse controller and data shifter accomplishes control of a thermal print pulse by altering the pulse width of the print pulse according to the printing history. Data is obtained from the printhead and recirculated for logical operation with previous records back to the printhead during predetermined phases of the print pulse. As a result of the logical comparison a decision is made to continue or discontinue printing of a dot and thus prevent overheating the printing element.

4 Claims, 13 Drawing Figures

FIG. 4

DOT ADDRESS

```
        0   1   2   3 --------- 255
      ┌───┬───┬───┬───┬───────┬───┐
    0 │   │   │   │   │       │   │
      ├───┼───┼───┼───┼───────┼───┤
    1 │   │   │   │   │       │   │
      ├───┼───┼───┼───┼───────┼───┤
    2 │   │   │   │   │       │   │
RECORD├───┼───┼───┼───┼───────┼───┤
ADDRESS 3│   │   │   │   │       │   │
      ├───┼───┼───┼───┼───────┼───┤
      │   │   │   │   │       │   │
      │   │   │   │   │       │   │
      ├───┼───┼───┼───┼───────┼───┤
   15 │   │   │   │   │       │   │
      └───┴───┴───┴───┴───────┴───┘
```

FIG. 4A

|   |   |
|---|---|
| 0 |   |
|   |   |
|   | 3rd NEWEST DOT DATA |
|   | 2nd NEWEST DOT DATA |
| NEWEST RECORD POINTER → | NEWEST DOT DATA |
|   | OLDEST DOT DATA |
|   | 2nd OLDEST DOT DATA |
| 15 |   |

PRINT PULSE CONTROLLER FOR A TERMAL PRINTHEAD

BACKGROUND OF THE INVENTION

1. Field of the Invention

The subject invention pertains to the art of electrically controlled printers and more specifically to thermal printing systems in which the electric current supplied to thermally responsive elements is varied according to the printing history.

2. Description of the Prior Art

In the development of thermal printing technology, it has become possible to perform high speed printing of characters and graphics. Generally, in thermal printing technology a plurality of electrically responsive thermal printing elements, for example, electrically resistive elements, are responsive to a print pulse which is an input electrical current pulse which causes the resistive element to generate heat. The heated resistive printing element, in contact with paper having a thermal dye impregnated thereon will cause a dot to appear on the paper. The printing elements may be configured in any manner desired to provide alphabetic or numeric characters or graphics.

With the need for the high speed printing of present day information systems, it has become necessary to control the print pulse to achieve quality displays. In order to achieve fast thermal printing, printheads have been produced utilizing on-head integrated circuit shift registers and drivers which reduce the overall time required to address a head with a random dot pattern. Prior to this integration, groups of printing elements typically were multiplexed in five or more print intervals. Alternatively, each element could be brought out to a separate electrical lead for interconnection. A typical printhead has elements arranged in a 1 by 256 dot configuration. It therefore became obvious that direct interconnection is not desirable since 256 separate electrical leads would be needed to the printhead.

The use of serial shifthead drivers in the printhead permits connection of fewer leads to the printhead. Fast operation is achieved by enabling the loading of the shift register at speeds of typically 1 megahertz for the on/off pattern of the serial entered dot on the data input line to the shift register. At the conclusion of the shift, for example after the inputting of 256 bits to the shift register, the pattern is present at the output of a parallel device, which pattern is then applied to the printing elements. Thus, users were able to print all the dots in a single print pulse. That is, the entire dot pattern comprised of signals for 256 dots existing at the output of the shift register would be printed upon the application of a single print pulse which enabled the transfer of the electrical signals from the output of the parallel device ultimately to the printing elements.

A problem however arose as a result of the new printing technique. When one of the individual printing elements were energized in several consecutive or nearly consecutive print cycles the elements became overheated. This would result in a blushing or blooming of the paper dye beyond the desired printing area rendering the printed copy unclear and also often resulted in the eventual thermal overloading and destruction of the printing elements themselves. This occurred since the thermal response of the individual elements is not instantaneous. Typically, sufficient temperature for a reaction with the paper dye is achieved at the printing element surface after a short power pulse in the range of 1 to 10 milliseconds. A longer period is required for the element to return the printing element substrate to ambient temperature, this decay period being typicaly several times the initial response. If the element is reenergized at a point shortly after it has reached its peak temperature but before it has had the chance to return to the ambient temperature of the substrate, due to residual heat, a higher peak temperature will be reached in the element than was previously obtained.

If the printing element is continually reenergized in this manner, eventual cumulative temperature rise will cause paper blushing and eventually element destruction from overheating. If however the element is reenergized after it has returned to the ambient temperature of the substrate or a temperature relatively close to that point, minimal cumulative heating occurs.

Users of the integrated drive heads described herein who encountered this problem have attempted to overcome it by using one of two solutions. (1) The thermal response time of the element has been minimized, to increase the rate at which the element dissipates heat and thereby decrease the time it takes the element to return to ambient temperature. Minimization of thermal response time also provides faster heating of the element. In present thermal printheads this has been optimized to the state of the art and the response times achieved are still not adequate to prevent the problems of overheating and dot blushing. (2) Faster cooling of the elements has been provided for the rapid dissipation of heat. This is ordinarily done by bonding a massive heat sink or radiator to the printhead substrate. This technique is wasteful of power, since, a good deal of heat generated in the printhead is radiated into the environment and is thus not available to be utilized in the printing process. Furthermore an idle period during which no printing could take place is still required to allow for the proper heat conduction into the heat sink. The enforced idle period slows printing.

It is thus an object of the invention to provide an electrically responsive printer capable of printing at high speeds;

It is a further object of the invention to provide a high speed thermal printer;

It is another object of the invention to provide a high speed thermal printer capable of power efficient operation which does not dissipate large amounts of heat into the environment;

It is still a further object of the invention to provide a thermal printer without an enforced idle period;

It is a further object of the invention to provide a high speed thermal printer in which the individual printing elements do not overheat during the printing process; and It is yet another object of the invention to provide in a high speed thermal printer a high quality printout.

These and other objects and advantages of the invention will become more apparent upon reference to the specification and the drawings annexed hereto.

BRIEF DESCRIPTION OF THE DRAWINGS

FIGS. 4 and 4A are diagrams of the print record RAM structure;

SUMMARY OF THE INVENTION

The present invention is an apparatus for controlling data to be printed by and the print pulse provided to printhead. The apparatus refers to the prior printing history of each individual printing element which provides the printed image as a result of a stimuli responsive to an electrical input, and controls subsequent data inputs to the printing element based upon the known decay characteristic of the stimuli.

In a preferred embodiment the printhead is a thermal printer and the stimuli is heat. Depending upon the time which has elapsed since an individual printing element was energized to perform the printing function, the print pulse width is altered. The print pulse is divided into a plurality of individual periods or phases, and previous printing histories are examined during each of the phases to determine whether or not an element should be energized.

DETAILED DESCRIPTION OF THE PREFERRED EMBODIMENT

Figure 1:
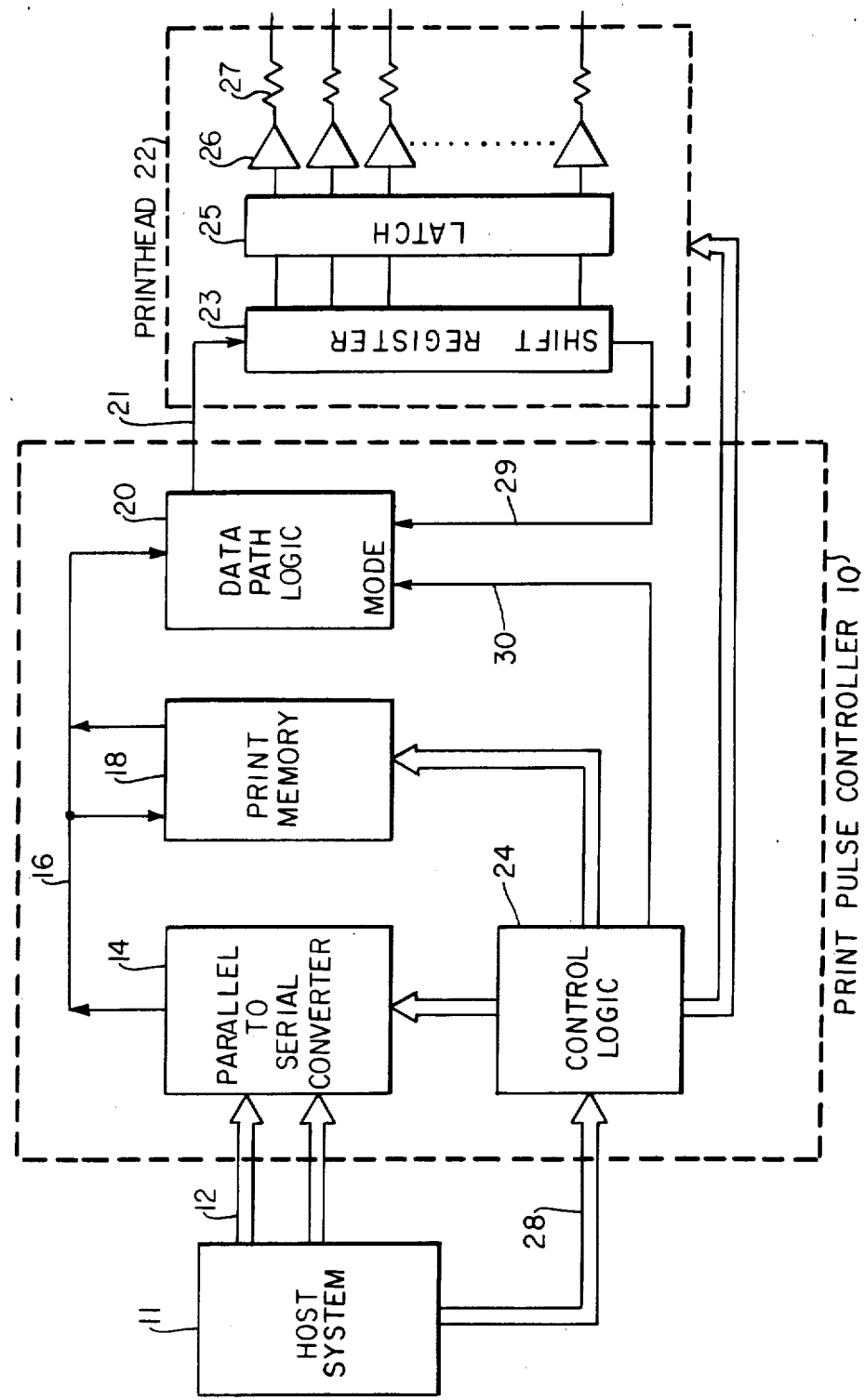
FIG. 1 is a block diagram of the invention.

Referring to FIG. 1, a printhead data shifter and print pulse controller 10, according to the present invention is shown coupled to receive signals from a host system 11. The host system may be any device which generates data in a digital format which data needs to be recorded in a printed form. The host system may be for example a computer, an analog to digital converter, measurement system or any other device for which a printed record of the data is required. The host system provides the data on a data bus 12 for entry into the parallel to serial converter 14. It will be appreciated that the data may be supplied in a bus of any desired bit width. Microprocessor's often utilize data in 8 bit bytes. In such case data bus 12 may beneficially be 8 bits wide. Parallel to serial converter 14, which will be described further hereinbelow, converts the parallel formated data applied on data bus 12 into a single bit wide bit stream exiting on lead 16 for entry into the print memory 18 and also to data path logic 20.

Printhead 22 is an integral unit including a shift register typically 256 bits wide to accommodate printing of a single line of 256 dots. Printhead 22 also includes a latch 25, for storing data while the shift register is shifting and drivers 26 for driving the printing element 27 which are resistances that generate heat that in contact with thermal paper, prints a dot. One such printhead is the RICOH TH-3373. The parallel to serial converter 14 print memory 18, data path logic 20, shift register 23, latch 25, and drivers 26 of printhead 22 are all under the control and direction of control logic 24 which, as will be described hereinbelow ultimately controls printhead 22 according to the principles of the present invention.

Figure 2:
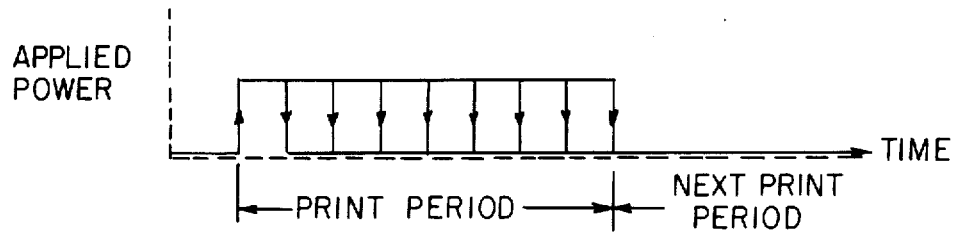
FIG. 2 is a diagram of print pulse modulation useful in explaining the invention.

In conventional thermal printers a print pulse having a predetermined period is applied to a printing element to be heated followed by an idle or cooldown time in which the dot is permitted to return to ambient temperature. In the present invention, the standard print pulse is divided up into eight subdivisions or phases and the amount of heat delivered by the element is varied by a form of pulse width modulation as illustrated in FIG. 2. Power is applied in the first phase to all printing elements which are to print a dot on paper during the print period. In subsequent phases, the printing element may be selectively de-energized depending upon the prior printing history for the particular printing element. The longer a print element is energized, the more it tends to heat up. The heat required depends upon when a given thermal element was last energized, the speed of the advance of the paper supply past the printhead, ambient temperature and other conditions. Due to the selective deenergization there is no need for an idle or cool down period. Therefore, successive print cycles may be performed without an idle period between them, which greatly enhances printing speed.

Any number of print phases may be selected. The greater the number of phases selected the greater is the control over the energy delivered to an individual printing element. The greater the number of print phases selected, however, the more complex the circuitry becomes. It has been found that using presently available printheads eight phases provides sufficient control over the thermal elements to operate satisfactorily without causing undue complexity to the resulting circuitry.

As stated hereinabove, the requirements for re-energization of the thermal element on subsequent printing cycles will depend upon among other things the ambient temperature and the chart paper speed. Data relating to these factors or a print curve according thereto may be input into print pulse controller 10 from the host system 11 to control logic 24 via bus 28. Alternatively, this data may be entered into control logic manually or from the thermal printer/printhead itself.

Figure 3:
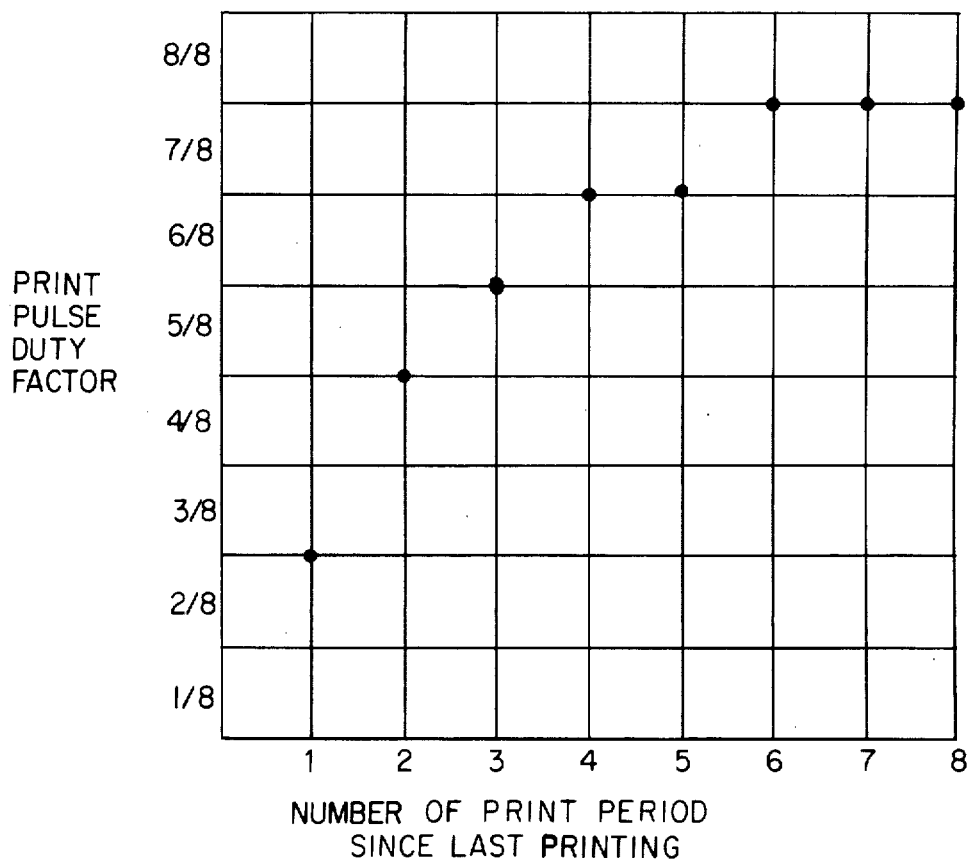
FIG. 3 is a diagram of print pulse duty factor as a function of periods since last printing useful in explaining the present invention.

FIG. 3 shows an example of a typical print control curve. This curve is derived from a typical thermal printhead printing element cool down response characteristic. The abscissa shows the number of periods or print pulses since the last printing by a given thermal element and the ordinate shows the print pulse duty factor desired to be applied to the thermal element in view of its cool down time. The print pulse duty factor is given in units of one-eighths based upon an 8-phase print pulse.

FIG. 3 may be understood by considering the ordinate as showing the duration of a lapsed time beginning at time zero. At time zero all printing elements for which it is desired to print a dot are energized. During the interval of phase 2 no dots are cancelled. At the beginning of the third phase all dots on one cycle previously are cancelled. Thus for all thermal elements having been printed one cycle previously a pulse having a duty factor of 2/8 is applied during the current printing cycle. In this example, this is sufficient to ensure complete printing of the dot by the still warm printing element. During the fourth phase of the pulse no thermal elements are de-energized but at the beginning of the fifth phase all thermal elements on two cycles previously are de-energized. Similarly, at the beginning of the sixth phase all thermal elements on 3 cycles ago are de-energized. In the beginning of the seventh phase all dots on four or five cycles previously are de-energized and at the beginning of the eighth phase all dots on six, seven and eight cycles previously are de-energized. At the completion of the eighth phase corresponding to the beginning of the ninth phase the cycle repeats itself. The beginning of the ninth phase will then correspond to the beginning of the first phase and and a new set of printing elements will energized or de-energized according to the desired pattern of the new cycle.

The print pulse controller operates in two different modes. In the first mode or initial load phase, data is loaded or written into the print memory 18. Print memory 18 can operate in a write or read mode. The dot pattern to be printed is serially issued from the parallel to serial converter 14 and is simultaneously read into both the print memory and the printhead shift register 23 via the data path logic 20. Shift register 23 is a conventional shift register having 256 cells. In order for the data to enter into the shift register 23 data path logic 20 is transparent. When data path logic 20 is transparent, print memory 18 is in the write mode. The mode of the data path logic is selectable and is selected by the control logic 24 via a signal applied along lead 30.

Subsequently, data path logic 20 enters and remains in the second or recirculating mode. As may be seen by reference to FIG. 1, data from data path logic 20 enters into shift register 23 via lead 21. In the recirculate mode data from the last bit of shift register 23 is shifted on lead 29 back into data path logic 20 where logical operations are made comparing data from the print memory and data from the shift register which is then shifted into shift register 23. By operating on the data emerging from data path logic 20 in the appropriate manner, the thermal element may be de-energized or not depending upon the print record and the functioning of the data path logic 20. The data is continually shifted through the data path logic 20 and shift register 23. Due to varying printing histories of the printing element at any time a complete shift data input sequence is required to set up the entire head shift register once every phase.

As will be noted from the example of FIG. 2 the variation of the print pulse duty factor with printing history is not a linear function and in fact is variable depending upon, as stated above, conditions such as ambient temperature and chart paper speed which may change during the course of any given printing process. The proper print pulse width for any given element is dependent upon both the organization of the print memory and upon the logical structure of the data path logic 20. Referring to FIGS. 4 and 4A logical structure for the print memory 18 is shown. The memory is structured as a circular buffer in which the newest dot data is successively written over the oldest dot data by incrementing the newest record pointer as shown in FIG. 4A. This takes place during phase 1 of each print cycle. As previous records are read during the cancellation or subsequent phases, i.e., phase 2 to 8, the memory is addressed back from the newest record. Implementation of print memory 18 as a circular buffer allows each record to remain in its place until it is over-written with more recent data. This is accomplished using a pointer mechanism to point to addresses for the newest data. The record printer is controlled by the control logic 24, as described below. The position in memory pointed to in the read mode by the pointer depends upon the cooling curve for an element as shown, for example, in FIG. 3.

Table 1 shows the data path logic function. In the transparent or memory write mode data from the print memory is coupled directly to the thermal printhead 22. As indicated by the "x's" in the transparent mode, the data path logic does not care what data emerges from shift register 23. Presumably, until the shift register has been filled up with the first print line a series of zeros will be entered into the data path logic on lead 29.

TABLE 1

| DATA PATH LOGIC FUNCTION | | | | |
|---|---|---|---|---|
| Data Path Mode | Print Memory | Data From Head | Data to Head | Action |
| Transparent | 0 | X | 0 | Dot Starts OFF |
| (memory write) | 1 | X | 1 | Dot Starts ON |
| Recirculate | 0 | 0 | 0 | Dot remains OFF |
| (memory read) | 0 | 1 | 1 | Dot remains ON |
| | 1 | 0 | 0 | Dot remains OFF |
| | 1 | 1 | 0 | Dot cancelled OFF |

In the recirculate mode a printing element is either energized or not energized, depending upon the operation of the logic. In this mode, control logic 24 causes previous print records to be read from the print memory 18 during each print phase in synchrony with the print head shift register shifting. In this manner, the state of a thermal element during each print pulse phase is logically derived from the state in the previous cycle and the state of that element at some prior print cycle as stored in print memory 18. The net effect is that the duty factor of those printing elements which have been printed recently is shortened; the more recently a dot has been printed and a thermal element energized, the shorter its print pulse will be during the subsequent or current print cycle.

In the first row of the recirculate mode in Table 1 a zero is read from the print memory 18 and a zero is read from the data from the head 22. A zero will be returned to the head since the printing element must remain in the off condition to prevent printing of a dot.

The second row of the recirculate mode in Table 1 shows the condition in which a 0 is read from the print memory 18 and a 1 is read from the print head 22. Under these conditions a 1 is returned the printhead 22 corresponding to the condition in which the printing element remains on, since it is necessary to leave the printing element on to accomplish the proper and complete printing of a dot.

Referring to the third line a 1 is read from print memory 18 and a 0 is read from print head 22. A 0 is entered into the print head since the current data as shown by the data from head column indicates that a dot is not to be printed. Consequently, the printing element will remain non-energized so that no dot is printed.

Referring to the fourth row of the table, reference to the previously described operation of the record pointer is made. The fourth row shows the condition where the print memory 18 and the data from the head 22 are both 1's. Although it is clear that a dot should be printed on the paper, this will be accomplished by residual heat remaining in the printing element from previous print cycles. Thus, for example, referring to FIG. 2, even if the immediately previous dot was a 1, the pointer would not be pointed to that element until the beginning of the third print pulse phase. By varying the sequencing of the pointer, the turning on or off a thermal element due to the fourth row conditions of Table 1 is accomplished.

Figure 8:
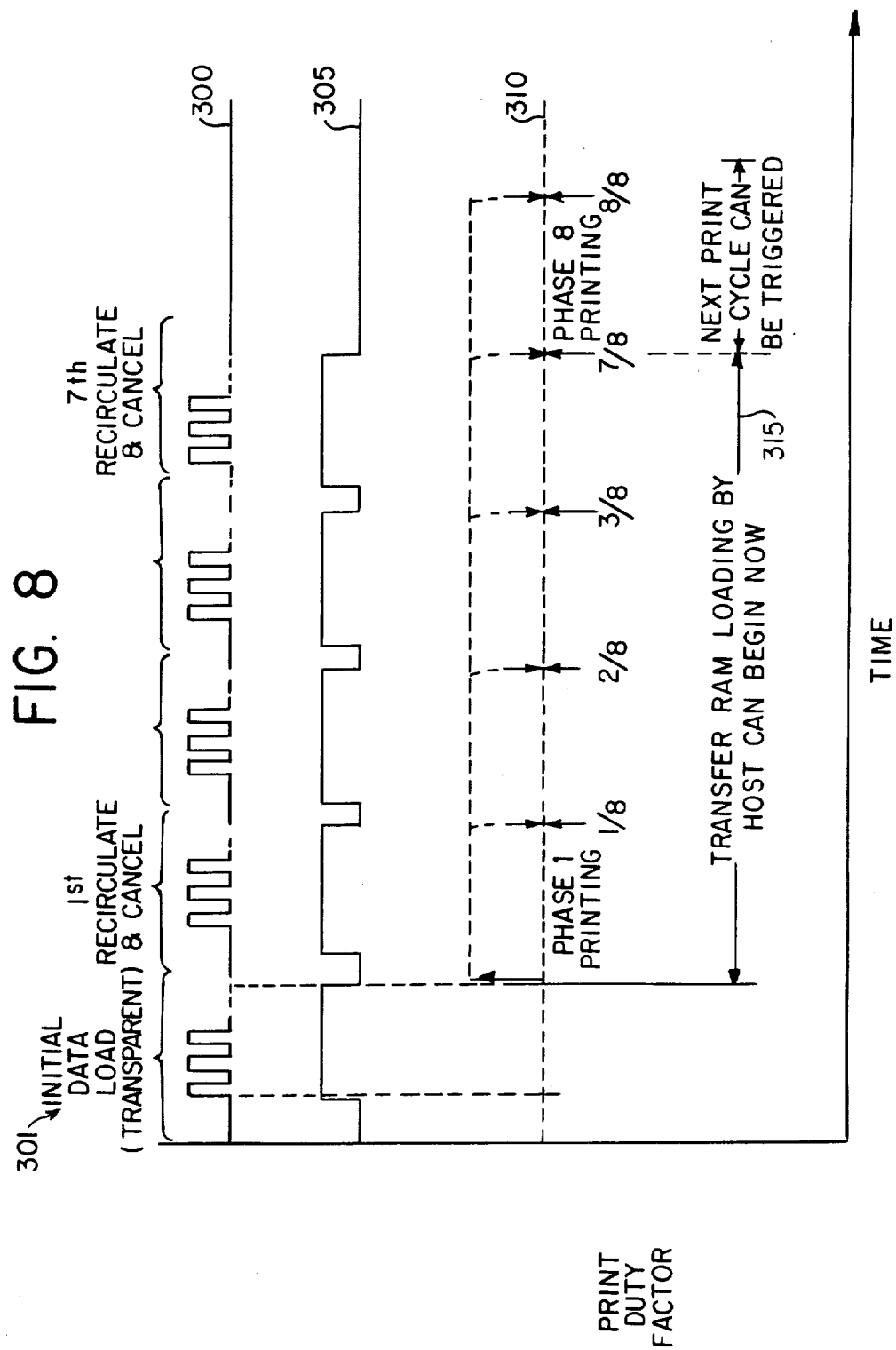
FIG. 8 is an timing diagram of the overall print cycle of the present invention.

Referring now to FIG. 8, the overall print cycle and timing is shown. Curve 300 shows the application of clock signals to the printhead 22. It will be noted that in the section denoted 301 initial data load occurs when the data path logic 20 is in the transparent mode. The printhead latch 25 reads data from the shift register 23 and continues to hold data from the previous cycle. Since in the initial data load there was no data from the previous cycle all dots are off as shown at 310. At the end of the initial data load as shown by arrow 315, loading of the print memory 18 can begin. The data from the printhead latches into the shift registers 23 and the phase 1 printing can begin. During this phase no dots are cancelled. After the printhead latch 25 has unloaded data into the printing element drivers 26, new data will be circulated into the shift register 23 and this process continues as shown by the subsequent phases corresponding to the second, third and seventh recirculate and cancel periods.

Figure 5A:
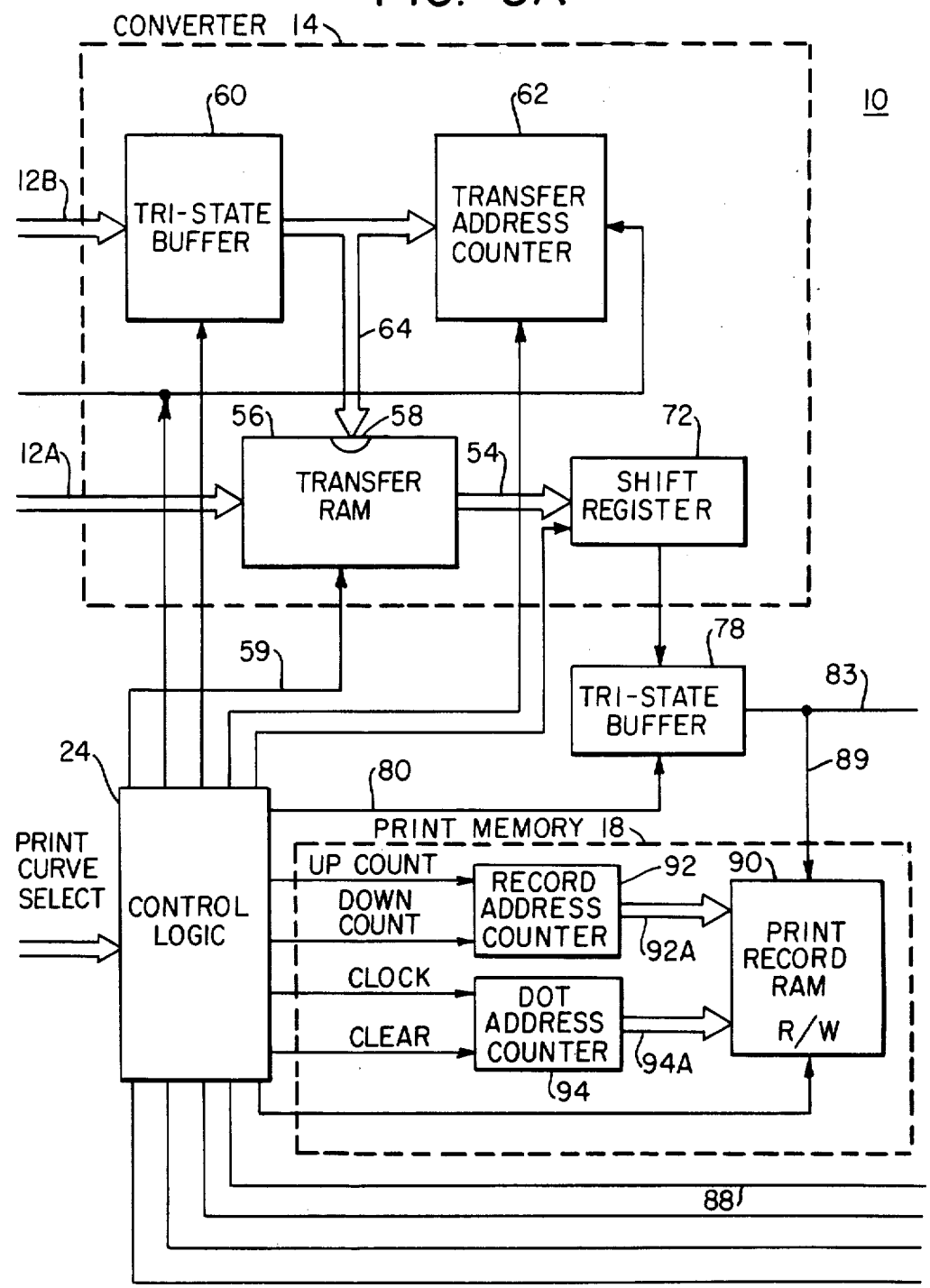
FIG. 5 is a block diagram of a preferred embodiment of the invention.
Figure 5B:
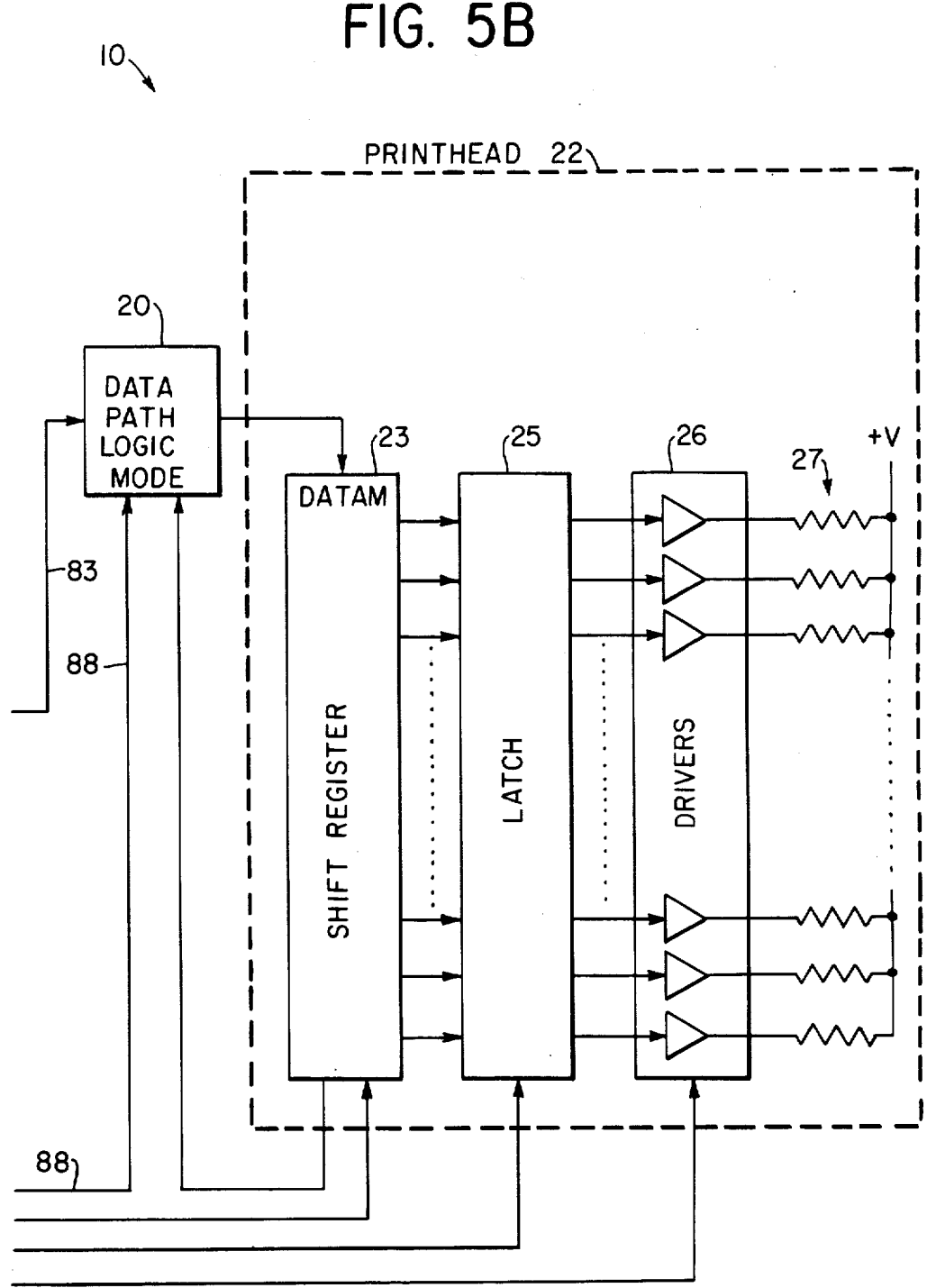

FIG. 5 shows the print pulse controller and data shifter 10 in greater detail. The operation may be better understood by reference to the flowcharts in FIGS. 6 and 7, and the timing diagrams in FIGS. 8, 9 and 10.

Parallel to serial converter 14 receives data on data bus 12A which data enters into transfer RAM 56 thereof. Transfer RAM 56 is configured in an arrangement to accommodate 32×8 bits, or 256 bits corresponding to one 256 dot printed line. Address data is first entered into tri-state buffer 60 via address bus 12B which then is entered into transfer address 56 via bus 64. As will be explained hereinbelow, the address may also be generated within the parallel to serial converter 14 by transfer address counter 62. Data bus 12A may be 8 bits wide to accommodate typical microprocessors. It will be clear however to those skilled in the art that data buses of varying widths may be accommodated depending upon the data bus utilized in the host system. As an example, address bus 64 may be 5 bits wide and is thus useful in addressing 32 memory locations in transfer RAM 56.

Transfer address counter 62 is a counter utilized to increment the address of the data stored in the transfer RAM 38. Transfer RAM address counter 62 is clocked by the control logic 24 and enabled by either the host system 11 or the control logic as discussed further hereinbelow. Tristate buffer 60 is similarly enabled by either the host system 11 or control logic 24. Generally, when it is possible to write information into transfer RAM 56 from the host system, tri-state buffer 60 is output enabled by the control logic 24. Likewise, transfer address counter 62 will be disenabled. When it is necessary to read data from transfer RAM 56 during the initial load phase it will be switched into the read mode under control of control logic 24 via a signal on lead 59, transfer address counter 62 is enabled, and tri-state buffer 60 will be disenabled. On subsequent counts transfer address counter 62 is incremented one bit at a time to address contiguous bytes of data in transfer RAM 56.

It will be noted that once the initial load phase and initial information i.e., in the present example the first 256 bits corresponding to the first printed line, has been loaded, subsequent operation differs from the initial load phase since the recirculate phase is then entered.

Figure 6:
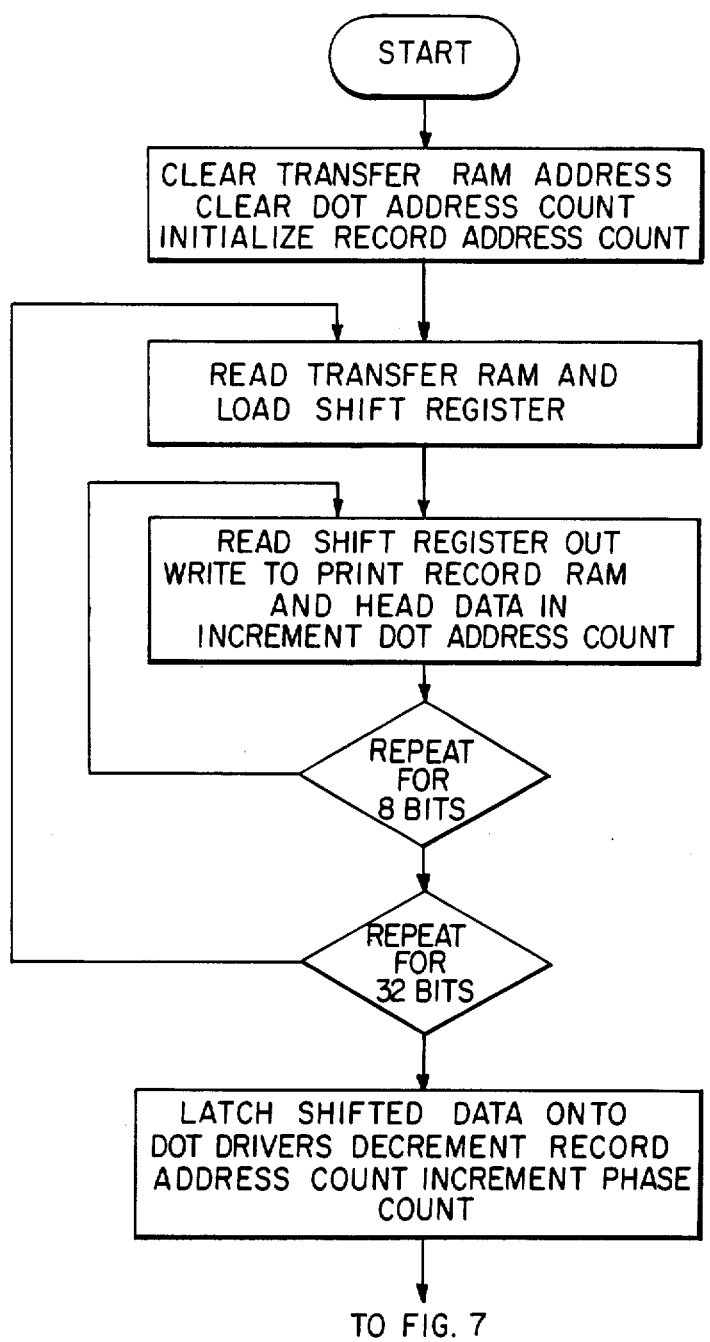
FIG. 6 is a flow chart of the operation of the invention in the initial load phase.

Referring to FIG. 6 which is a flowchart showing the initial load phase upon power up or start of the thermal printhead controller, the transfer RAM address is cleared. Shift register 72 under control logic 24 accepts data from transfer RAM 16 via data bus 34. Data is entered into bus 54 and typically is 8 bits wide as is the data that enters transfer RAM 16. Shift register 72 may be a conventional shift register which serializes information entered therein and provides a serial output of individual data bits at a one bit wide output port 75. The data bits are then coupled to lead 36 which is in turn coupled to the input of tri-state buffer 78.

Tri-state buffer 78 is a conventional tri-state buffer, which upon application of a signal from control logic 24 via lead 80 is enabled to permit the flow of data to lead 83 coupled to an output port thereof. The transfer RAM data is thus read a single bit at a time via shift register 72 and tri-state buffer 78 into data path logic 20 via lead 83. In the initial load phase, data path logic 20 under control of the control logic 24 via lead 88 will be in the transparent mode and permit shift register 23, typically located within the printhead assembly 22, to load directly.

As discussed previously, data path logic 20 also operates in a recirculate mode in which data from shift register 72 is recirculated into the input of the shift register 23 thus permitting reentry of data from the shift register into the input. Referring again to Table 1, in the transparent or memory write mode data from the print memory 18 is coupled directly to the printhead 22. As is indicated by the "x"s in the transparent mode, the data path logic does not care what the data from the head shows.

The shift register output is thus entered into the print memory 18 simultaneously as it is read into the printhead data input terminal.

Print record memory 13 is comprised of print record RAM 90, which may be a conventional RAM, and further includes record address and dot address counters 92 and 94 which are counters described further below.

Print record RAM 90 stores each serially formed print pattern, i.e., the record for a selected number of print cycles. As the oldest record is replaced by the newest one each time the serial data stream is derived from the parallel to serial converter via lead 89. The print record RAM is organized as an $M \times N \times 1$ bit array having $M \times N$ addressable locations. M corresponds to the number of bits in the head shift register to be shifted each time and N represents the number of print records in the array. In the present embodiment, there are 256 bits in the printhead shift register 23. Due to the binary structure of the logic, the number of records should be selected to be a power of 2. At least $2^3$ or 8 records are required. However, it is desirable to be able to look at more than 8 records, thus 16 records will ordinarily be stored. Since it is desirable to record the dot data for the previous 16 records N, =16. Print record RAM 90 therefore has a $256 \times 16 \times 1$ or $4K \times 1$ bit structure.

Print record RAM 90 has a logical structure in which dot addresses of 0 to 255 form a first portion of the data address and dot addresses of 0 to 15 form a second portion of the address. Thus, information for an individual dot to be printed may be accessed. The record pointer which is comprised of the record address counter 92 may be either incremented or decremented under the direction of control logic 24 via a signal on bus 92A. The dot address counter 94 may be either incremented or cleared also under the direction of control logic 24, via a signal on bus 94A. This data is written in during the first phase of each print cycle. Dot address counter 94 is incremented to provide an address so that each stored dot may be returned.

Referring to the flow chart of the initial load phase in FIG. 6, the shift register output is written into the print record RAM 90 and the dot address counter 94 is incremented 8 times, after which the data in transfer RAM 56 is read again into shift register 32 corresponding to the next 8 bit byte. The entire process is repeated 32 times until a total of 8×32=256 bits has been read into print record RAM 90. It will be noted that this corresponds to a single line as printed on paper. At this point, the data which also has been simultaneously read into shift register 23 is read by latch 25 which in turn reads the data onto the dot drivers 26 which in turn activates the individual dots 27 and thus permits printing of a dot on thermally responsive paper (not shown). It will be noted that both the latch 25 and printing element drivers 26 are also under the control of the control logic 24 and are also enabled at this point in time.

Referring again to FIGS. 5 and 6, record address counter 92 is then decremented one phase count. Thus, in accordance with the print record logical structure shown in FIGS. 4 and 4A the print record address which began in the zeroeth row is decremented and the row number 1 is now accessed.

The system is now initialized and previous data history becomes important for printing of subsequent lines. As discussed hereinabove, each subsequent print cycle is divided into 8 periods or phases. While all dots are enabled during the first phase, the minimum time to properly reenergize the dot will be at least one phase even if it was printed on the immediately previous print cycle. Subsequently, during the recirculation phase, reference is made by the data path logic 20 to the records stored in print record RAM memory 90 to determine whether or not it is necessary to continue to keep the printing element energized to print a dot.

Figure 9:
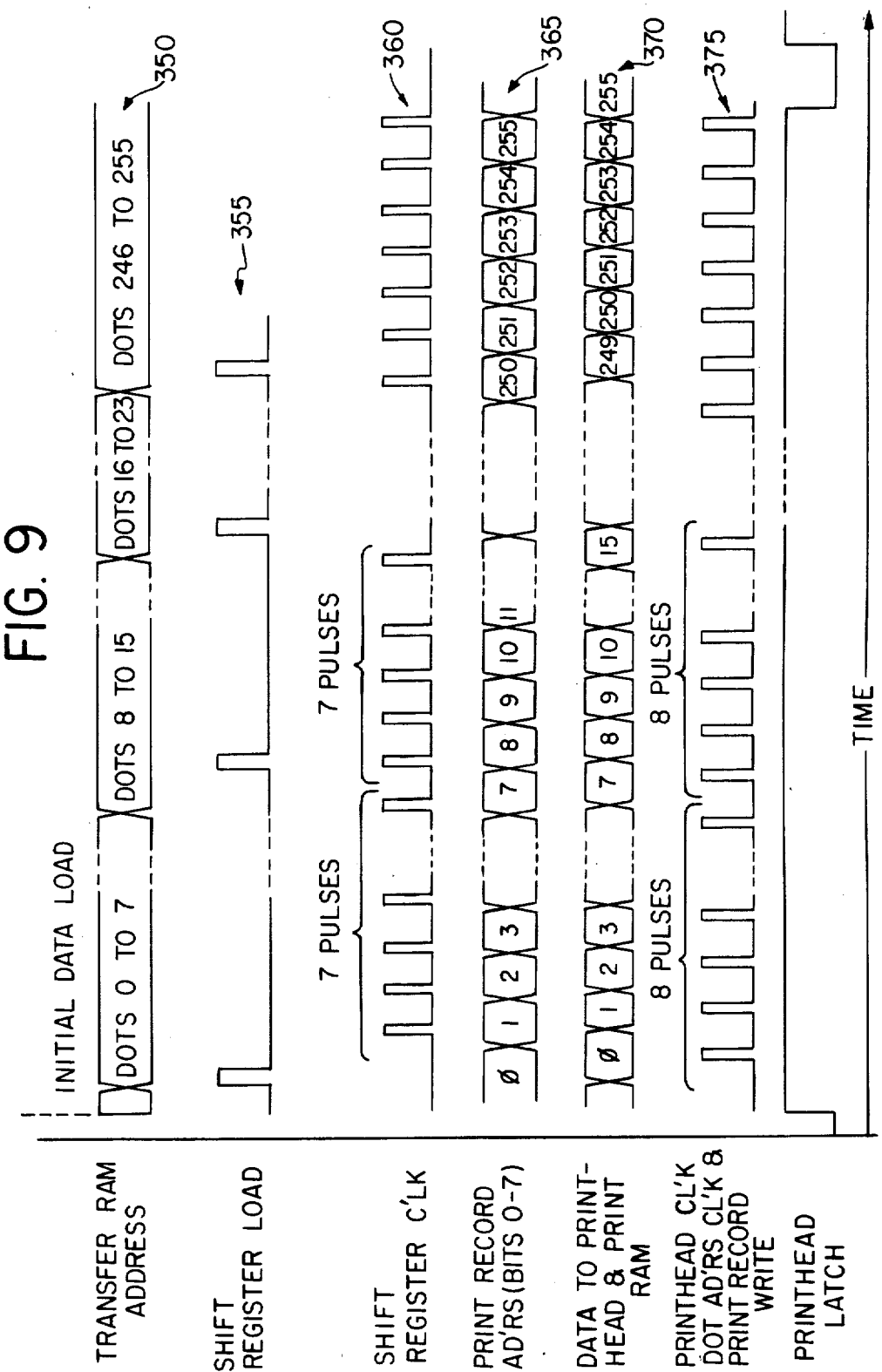
FIG. 9 is an timing diagram of the initial load phase of the present invention.

FIG. 9 shows a timing diagram for the sequence of steps of the initial load phase. Transfer RAM 56 is addressed to obtain dots 0 to 7 during the first period as indicated by curve 350. At the beginning of this period, the shift register is loaded with the previous data and then as shown by at 355 falls back to 0 for the remainder. During this time, shift register 72 as shown at 360 is pulsed 7 times to permit the serial unloading of the shift register 72 and the loading of the print record RAM 90, which is now in the write mode. The print record RAM 90 is addressed with addresses 0 to 7 and in subsequent periods 8 through 15, etc. to load in the data, shown at 365. At 370 the individual dots are loaded into the printhead 22 and into the print record RAM 90 during the period ending in respective print pulses of the shift register clock. The printhead clock, dot address clock and print record write signals as shown at 375 are pulsed 8 times as defined by the initial transfer of the dot data such that the trailing edge of the pulse is coincident in time with the trailing edge of the print record address. During the entire period of the load of the first 255 dots the printhead latch 25 is in a mode to accept data but does not pass the data to printing element drivers 26 until a brief unloading phase shown when the printhead latch signal goes low.

Figure 7:
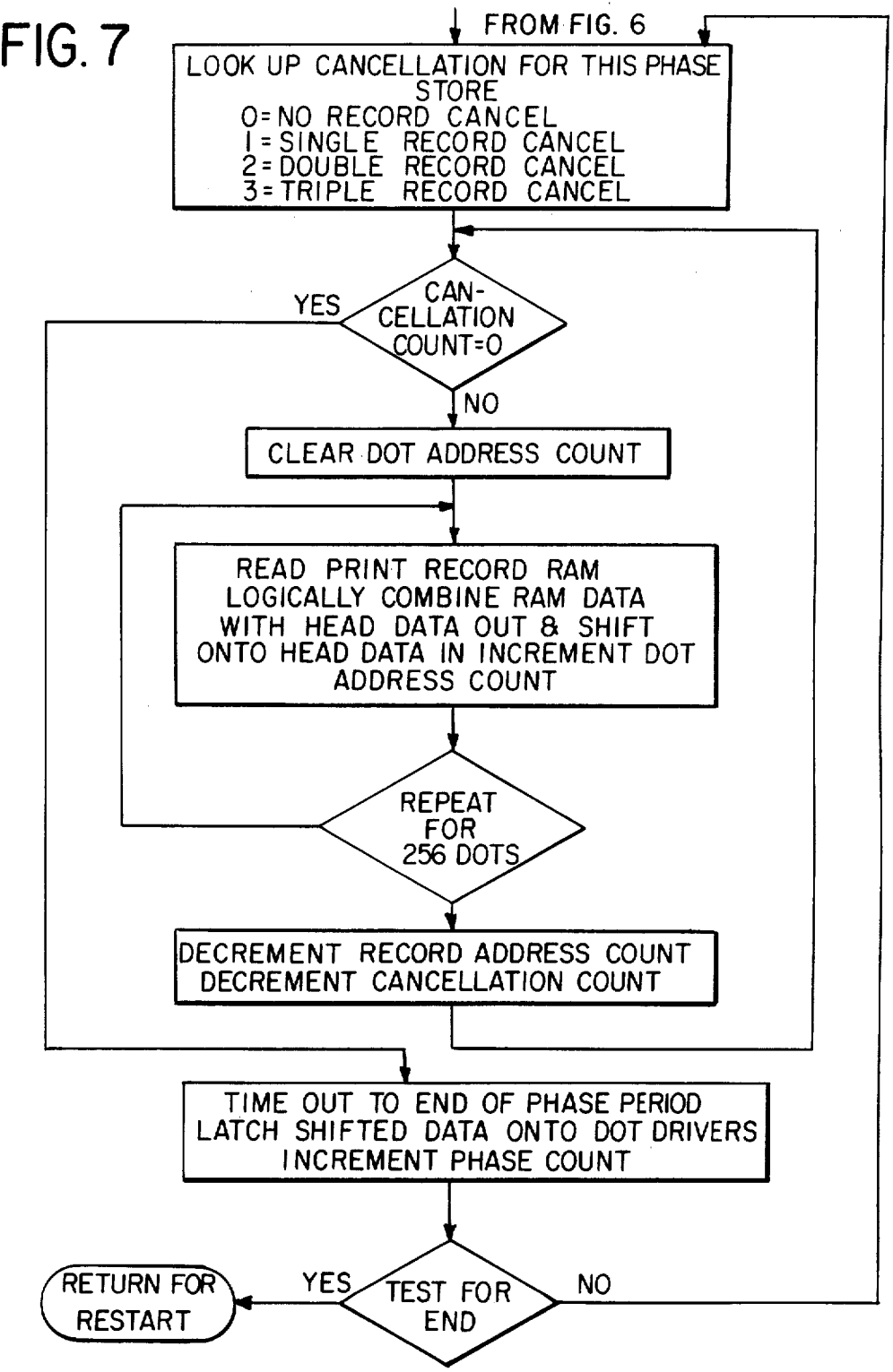
FIG. 7 is a flow chart of the operation of the invention in the recirculation phase.
Figure 10:
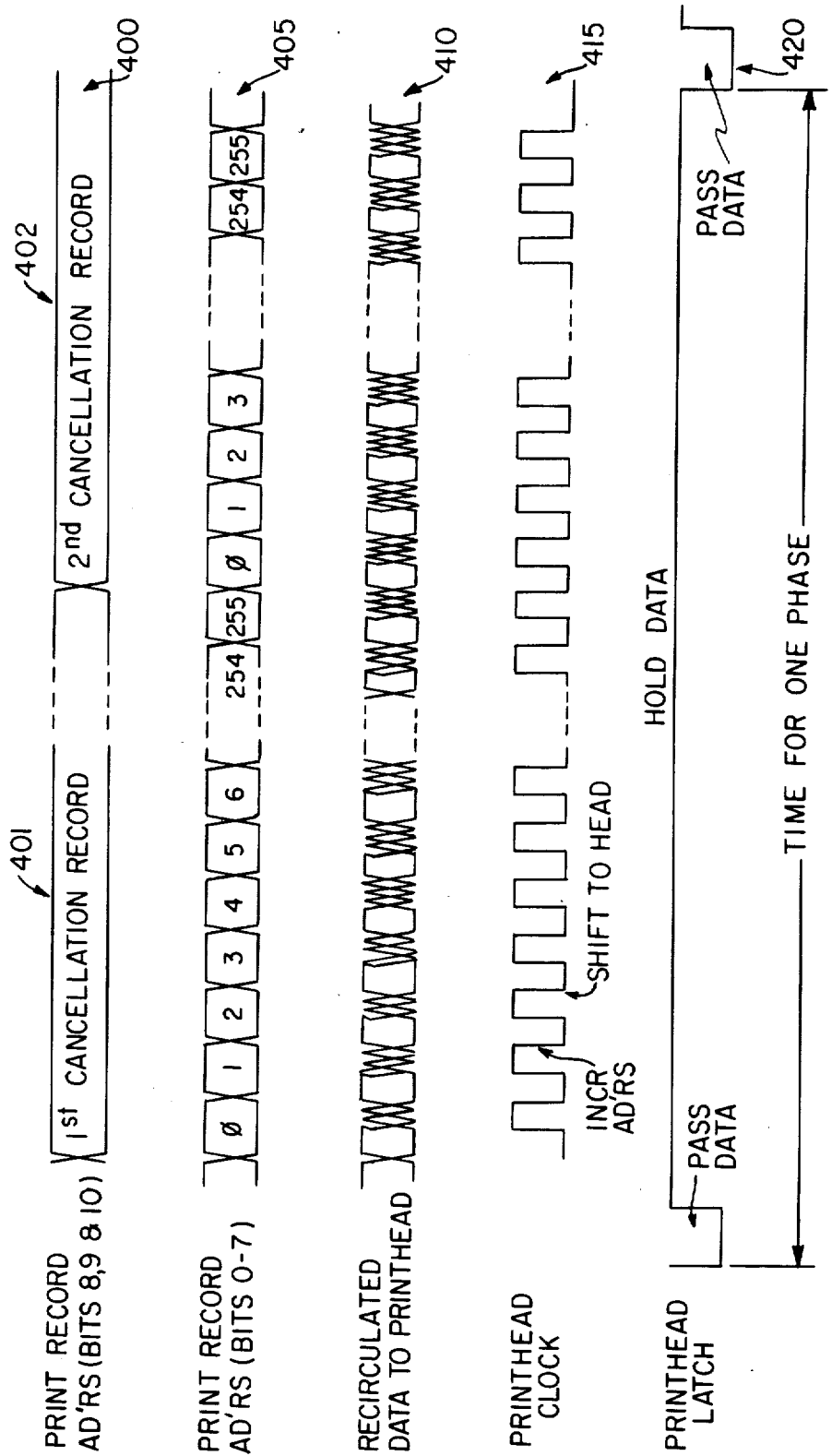
FIG. 10 is a timing diagram of the recirculate and cancel phase of the present invention.

Referring now to the flow chart of FIG. 7, the block diagram of FIG. 6, and timing diagram of FIG. 10 operation of the invention in the recirculation phase can be further explained as follows. In the first step, cancellation for the particular phase in which the device is in is looked up. This data, which corresponds to the curve of FIG. 3, is entered into the control logic 24 on bus 552 and is described more fully below. If there is to be no cancellation at this time, cancellation can then be set to equal 0. On the other hand, if the single record is to be cancelled as in for example the first dot of the graph of FIG. 3 the cancellation count is set equal to 1. If there is to be a double record cancel, the cancellation count is set equal to 2. This corresponds for example to the cancellation of dots at the print periods 4 and 5 of FIG. 3. Finally, if the cancellation count is equal to 3 there will be a triple record cancel corresponding for example to the print periods 6, 7 and 8 of FIG. 3. It will be understood that any number of cancellation counts may be assigned and that more than eight previous periods may be examined. Referring to FIG. 10, a double record cancellation is shown. It will further be understood that single or triple record cancellations will show similar timing either compressed or expanded to fill one printing phase.

Once the cancellation count has been input, control logic 24 determines whether or not the cancellation count equals zero. If, in fact, the cancellation count does equal zero in the first phase immediately following printing of the prior print pulse, the remaining logical functions are skipped and the control logic 24 jumps to a procedure wherein the print pulse controller 10 is timed out to the end of the phase period. The data appearing in shift register 23 is then transferred to latch 25 and subsequently transferred to printing elements 27, allowing energization of the desired printing elements. The phase count is then incremented by 1 and it is determined whether or not this is the final print pulse. If it is, the restarting of the printer is awaited.

In another example, and referring again to FIG. 10, the cancellation count for this phase is set equal to 2. At this time, when it is queried whether or not the cancellation count equals 0 the path indicated by NO will be chosen. The dot address count in dot address counter 94 is then cleared by control logic 24 during the first cancellation record period 401 of diagram 400. Print record 90 is then read in via data path logic 20. As previously described the RAM 90 data is logically combined in data path logic 20 with the data output from shift register 23. The resulting data is recirculated as shown at 410 in synchrony with the addressing and reading of the data from print record RAM 90.

The print record RAM 90 address is shifted on the trailing edges of the pulses at 415 and shifting to the printhead 22 occurs at the leading edges of the pulses at 415. This is repeated 256 times until dot address counter 94 reaches a count of 256. Record address counter 92 is incremented signifying the end of first cancellation record period 401. Thus, after 256 dots have been read in, corresponding to one printed line, the cancellation count is decremented by 1. Recall that the cancellation count was originally set equal to 2, and thus now equals 1.

This procedure continues again during the second cancellation period 402 for the next 256 dots. The count is then decremented by 1 again, becomes equal to 0 and the end of the second cancellation record period 402 is reached. The remaining logic is then bypassed and the logic is timed out to the end of the phase period. As shown at 420, data held in latch 25 is then passed to the printing elements 27 for printing. In this manner, depending upon the cancellation count for a given phase, a specific curve may be read into the apparatus. When the end is finally reached restart is returned to signifying the end of the print function.

A variety of control logic elements may be used to control the functioning of the various elements of the present invention. A microprocessor or microcomputer under a complete software control, a hardware implementation constructed with individual logic gates, or a hybrid system using hardware and firmware as shown in FIG. 11 and described in further detail below may be used.

Figure 11:
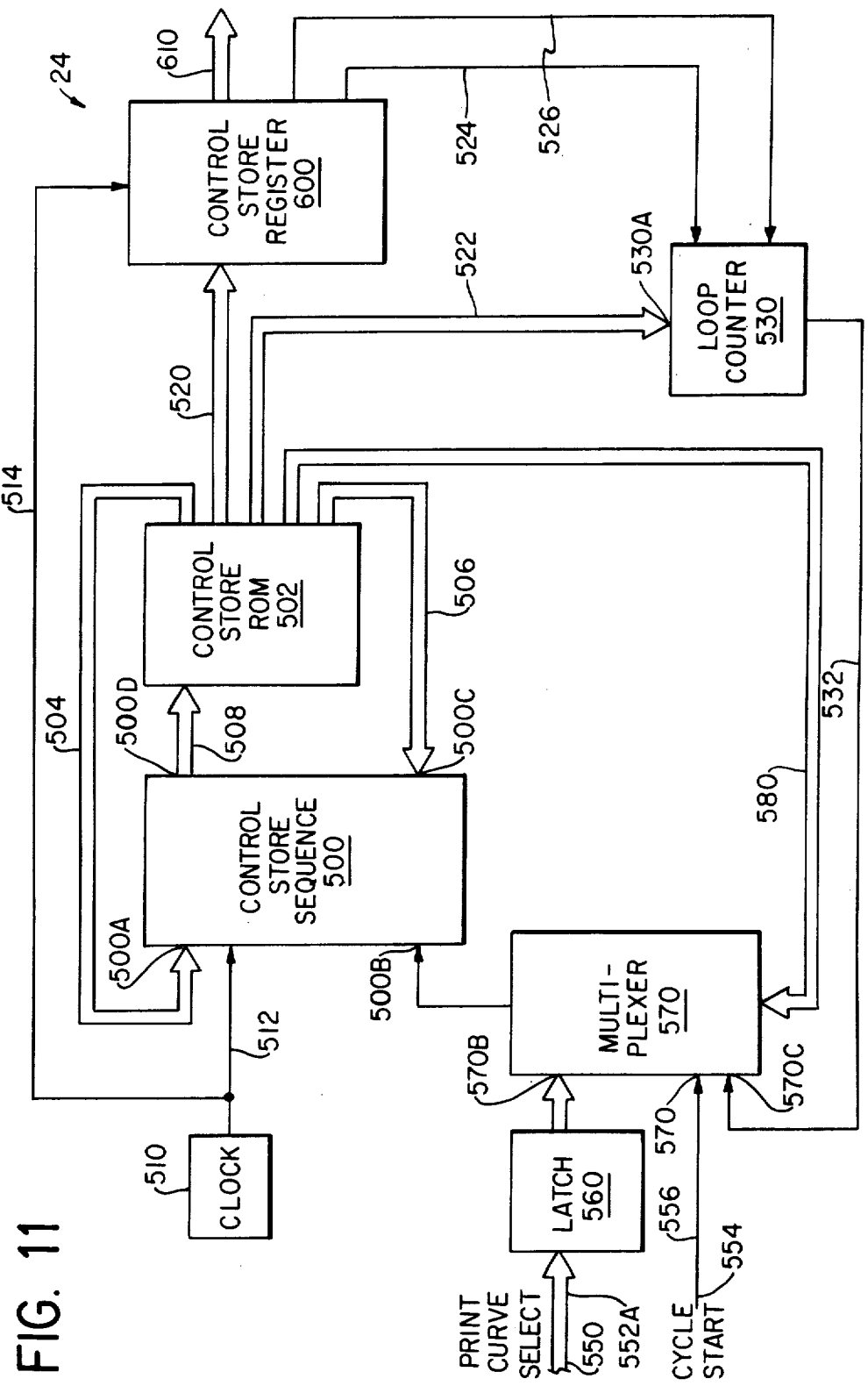
FIG. 11 is a block diagram of a control logic unit of the present invention.

FIG. 11 shows a preferred embodiment of the control logic 24. Control store sequencer 500 generates addresses to access instructions from control store ROM 502. Control store sequencer 500 is a highspeed device which provides an efficient means for controlling the flow of microprogram instructions. Control store sequencer 500 utilizes a limited instruction set to determine the sequence of instructions. As will be described, these microprogram instructions comprise the control logic signals utilized as described above in the invention. One such control store sequencer is the 8X02A manufactured by the Signetics Corp., 811 East Arques Ave., P.O. Box 409, Sunnyvale, Calif. 94086.

The control store sequencer has a variety of inputs which permit it to receive instructions and generate address outputs to select data such as further instructions from a RAM. The instructions are entered at the opcode input terminal 500A. The control store sequencer is capable of testing for the presence of a high or 1 signal at its test input terminal 500B which together with the opcode instructions permits the control store sequencer to perform conditional branching or looping.

The control store sequencer is capable of a instruction set typically including 8 instructions. These instructions originate from control store ROM 502 and are entered into the control store sequencer 500 via opcode bus 504. Opcode bus 504 may be 3 bits wide to access the possible 8 instructions.

Clock 510 provides, on line 512, a clock input utilized by the control store sequencer to perform the sequencing of instructions. The same clock input is also applied to lead 514 to control store register 500 as further discussed hereinbelow.

Control store ROM 502 is a pre-programmed read only memory of any suitable type known in the art. It may be of any configuration suitable for provision of the necessary data which must be stored in the ROM. The memory generally will be configured so that at least 3 bits provide the series of opcode instructions to be used by the control store sequencer as previously discussed. The control store ROM also stores the microprogram instructions which eventually are utilized to control the functioning of the elements of the present invention.

The instructions exit from the control store ROM on bus 610 which carries the following signals, namely: the printhead latch enable, the printhead enable, the printhead shift clock, the data path mode select, the dot count clock, the dot count clear, the record count up, and down, the transfer address clock, the shift out clock, and the print record RAM read/write select. These signals, it will be recognized, provide control for all other elements of the invention, as previously described.

The appropriate control signals originate from the control store ROM 502 and are stored therein according to a pre-programmed sequence of instructions as required and in accordance with the previous description and the flowcharts and timing diagrams of FIGS. 6 through 10. These instructions are applied to control store sequencer 500 at the address in input 500C via bus 506. The instructions are then output from the control store sequencer 500 at port 500D via bus 508 which addresses are then utilized by control store ROM 502 to select the appropriate instruction or data contained therein which is then transferred to the control store register via bus 520. Control store register 600 serves as a latch or buffer to provide temporary storage of the instructions to be output on bus 610 which instructions are output in accordance with signals received from clock 610 on lead 614.

Control store sequencer 500 can operate on the addresses it receives in a number of ways. For example, control store sequencer 500 ordinarily will increment the current address by 1 at the beginning of the next clock signal when the increment instruction appears in the opcode at terminal 500A. If, for example, no other instruction other than increment (INC) were applied to the control store sequencer 500, the address generated at address output terminal 100D would merely be incremented by a value of 1 on each clock pulse. Control store ROM 502 would then simply read through a series of addresses and output the data stored at those addresses in order.

Other instructions available to the control store sequencer 500, however, permit it to, for example, skip an instruction, that is, increment the current address by 2. Further instructions permit control store sequencer 500 to branch to sub-routines, loops or other portions of the program upon the presence of a high or one signal at test input 500B, that is, it determines if a test input is present at this terminal. Thus, sequences out of order may be selected as required by the invention.

Loop counter 530 is utilized only when it is necessary to perform a loop function. Loop counter 530 receives a repetition count on bus 522 at input port 530A. Loop counter 530 is clocked by control store register 600 and receives an output therefrom on line 524. Further, line 526, also originating from control store register 600, carries a signal used by loop counter 530 to initiate a load of the starting count.

The control store sequencer 500 utilizes 2 instructions to perform a looping function. These instructions are known as push for looping (PLP) and branch to loop if the test condition is true (BLT). Sequencer 100 includes a stack as in a conventional microprocessor. At the beginning of a loop, a PLP function is specified in the first instruction of the loop to push the current address onto the stack. The address register is then incremented and the loop is run. A BLT function is placed at the last line of the loop which pops the address of the first instruction of the loop off the stack and branches back to that address providing that a 1 is received at the test input.

Upon initialization of operation, the print curve is selected and this data is entered at input terminal 550 via data bus 552 and entered into latch 560. Similarly, at the cycle start a signal is input into terminal 554 which via lead 556 is carried to the input 570A of multi-plexer 570. Latch 560 is a conventional memory device which holds the cancellation count for each phase to implement the print curve selected, such as is shown in FIG. 3, as explained with respect to FIG. 7.

The cycle start signal initiates the beginning of the process and causes the control store sequencer 500 to generate signals in accordance with FIG. 6 in the initial load phase. Multiplexer 570 functions as a conventional multiplexer and selects data from latch 560 appearing on bus 565 and entered into multiplexer 570 at port 570B as well as data from the loop counter 532, and from the cycle start input at terminals 570C and 570A respectively. Multiplexer 570 selects the data it is to obtain under the control of control store ROM 502 via bus 580 which carries data indicating which data from the multiplexer inputs is to be selected to be transferred to test input 500B and thereby control the branching and incrementing operations of control store sequencer 500.

What is claimed is:

1. In a thermal printer, a system for controlling the energization of each one of a plurality of thermal print elements of a thermal printhead, each responsive to a printing pulse, wherein printing is accomplished during given individual print periods or print cycles, and each print period is divided into a plurality of individual and successive time periods or print phases, the system comprising:

print memory means for storing at least a number of lines of data equal to the number of print phases, the newest received line of data being for present printing, the other lines of data being successively "older" lines of data previously printed, during the present time of operation of said printer to print successive lines of data;

recirculative memory means for storing at the beginning of a print period a line of data to be printed, said line of data representing a predetermined combination of said printing pulses for energizing associated individual ones of said printing elements, respectively, at least during the first print phase of the print period;

data path logic means operative at the end of each one of said plurality of print phases other than the last print phase, for (1) receiving from said print memory means the previous line of data printed corresponding "agewise" to the next print phase number to be entered, (2) receiving from said recirculative memory means the contents thereof, (3) comparing via an algorithm the retrieved "previous line of data" with the combination of printing pulses during the last printing phase for the present line of data being printed, and as a result cancelling printing pulses for de-energizing the ones of said print elements required for printing the present line of data that have attacined a temperature sufficient for completing printing in the present print period due to their previous energization in prior print periods, and (4) returning or recirculating the altered line of printing pulses back to said recirculative memory means for reapplication to associated print elements of said printhead; and control logic means connected to said print memory means, recirculative memory means, and data path logic means, for controlling the operation thereof.

2. The thermal printer of claim 1, wherein said data path logic means includes means (1) for processing a "previous line of data" in accordance with said algorithm into a line of data bits represented by some combination of "ones" and "zeros", said present or current print pulses also being represented by a combination of "ones" and "zeros", and (2) for next comparing the previous data with the current print pulses to eigher terminate or retain each then existing print pulse in the next print phase in accordance with the following logic table:

| Previous Data | Current Print Pulse | Next Phase Print Pulse Result |
|---|---|---|
| 0 | 0 | 0 |
| 0 | 1 | 1 |
| 1 | 0 | 0 |
| 1 | 1 | 0 |

3. In a thermal printer, a method for controlling the energization via print pulses of each one of a plurality of thermal print elements of a thermal printhead, during each successive print period of said printer for printing a line of data, the data being in the form of a combination of "ones" and "zeros", the method comprising the steps of:

(A) dividing each print period into a plurality of equal length print phases;

(B) storing successive lines of data as they are received for printing, the number of lines stored being equal to the number of print phases;

(C) storing print pulses for a present line of data for providing printing pulses for application to associated ones of said printing elements, for initiating printing of the present line of data during a first print phase;

(D) comparing via an algorithm before initiation of each one of the second through next to last ones of said print phases, respectively, successively less recent ones of said lines of data, respectively, with the most recent ones of the print pulses, for terminating only the ones of said print pulses associated with print elements sufficiently heated, due to energization in a previous print period, for completing the printing of an associated dot, respectively, over the remaining printing phases of the present print period; and (E) recirculating the altered print pules back to associated ones of said print elements, respectively, at the initiation of the next print phase.

4. The method of step 3 further including in step (D) the step of determining said algorithm in accordance with the thermal chracteristics of said thermal printhead.

* * * * *

UNITED STATES PATENT AND TRADEMARK OFFICE
CERTIFICATE OF CORRECTION

PATENT NO. : 4,663,734
DATED : May 5, 1987
INVENTOR(S) : Jeffrey R. Berry

It is certified that error appears in the above-identified patent and that said Letters Patent is hereby corrected as shown below:

In the title, "TERMAL" should read -- THERMAL --.

Signed and Sealed this

Twenty-ninth Day of September, 1987

*Attest:*

DONALD J. QUIGG

*Attesting Officer*    *Commissioner of Patents and Trademarks*